US012751370B2

(12) United States Patent
Dighton et al.

(10) Patent No.: US 12,751,370 B2
(45) Date of Patent: Oct. 6, 2026

(54) SUGARCANE HARVESTER TOPPER HEIGHT CONTROL

(71) Applicant: DEERE & COMPANY, Moline, IL (US)

(72) Inventors: John A. Dighton, Napoleonville, LA (US); Mark S. Louviere, Houma, LA (US)

(73) Assignee: DEERE & COMPANY, Moline, IL (US)

(*) Notice: Subject to any disclaimer, the term of this patent is extended or adjusted under 35 U.S.C. 154(b) by 396 days.

(21) Appl. No.: 18/628,913

(22) Filed: Apr. 8, 2024

(65) Prior Publication Data

US 2025/0311675 A1 Oct. 9, 2025

(51) Int. Cl.

*A01D 45/10* (2006.01)
*A01D 34/00* (2006.01)
*A01D 47/00* (2006.01)

(52) U.S. Cl.

CPC ........... *A01D 47/00* (2013.01); *A01D 34/006* (2013.01); *A01D 45/10* (2013.01)

(58) Field of Classification Search

CPC ....... A01D 34/006; A01D 45/10; A01D 47/00
See application file for complete search history.

(56) References Cited

U.S. PATENT DOCUMENTS

| | | | |
|---|---|---|---|
| 2,648,943 | A | 8/1953 | Shafer |
| 3,325,982 | A | 6/1967 | Fogels et al. |
| 2013/0116894 | A1 | 5/2013 | Perez-Iturbe et al. |
| 2020/0404844 | A1 | 12/2020 | Gunda et al. |

FOREIGN PATENT DOCUMENTS

| | | | |
|---|---|---|---|
| AU | 2021218104 | A1 | 4/2022 |
| BR | 102019000985 | A2 | 9/2019 |
| BR | 102021013988 | A2 | 3/2022 |
| BR | 102020024754 | A2 | 6/2022 |

*Primary Examiner* — Adam J Behrens
*Assistant Examiner* — Ashley A Kaercher

(57) ABSTRACT

A sugarcane harvester includes an image sensor positioned to capture an image of a cut cross section of a sugarcane plant after removal of an upper leaf portion by a top cutter. A controller is operable to analyze an image of the cut cross section of the sugarcane plant and determine a location of the cut cross section of the sugarcane plant relative to a soft joint of the sugarcane plant from the image based on identification of any discrete leaf portions in the image. The controller may then control a topper actuator to adjust a cut height of the top cutter relative to the ground surface based on the location of the cut cross section of the sugarcane plant relative to the soft joint of the sugarcane plant.

19 Claims, 4 Drawing Sheets

SUGARCANE HARVESTER TOPPER HEIGHT CONTROL

TECHNICAL FIELD

The disclosure generally relates to a sugarcane harvester, and a method of controlling a topper assembly of the sugarcane harvester

BACKGROUND

A sugarcane harvester may include a topper assembly arranged to sever the upper leafy portion of the sugarcane plants from the central stalk portion of the sugarcane plant. The sugarcane plant includes a soft joint, at which the central stalk portion of the sugarcane plant transitions into the leafy upper portion of the sugarcane plant. The upper leafy portions of the sugarcane plants do not contain significant amounts of sugar, and may be removed prior to harvesting the central stalk portion of the sugarcane plants. The topper assembly is positioned above the ground surface and forward of a basecutter assembly to sever the sugarcane plants at the soft joint. The basecutter assembly is configured to sever the central stalk portion of the sugarcane plant from a bottom root portion of the sugarcane plant and move the central stalk portion of the sugarcane plants through the sugarcane harvester, whereby the central stalk portion of the sugarcane plants are processed into billets.

Positioning the topper assembly at too high an elevation will result in the topper assembly cutting the sugarcane plant above the soft joint, thereby leaving some leaf material attached to the central stalk portion, which must be removed by other processes, thereby reducing machine efficiency. Positioning the topper assembly at too low an elevation will result in the topper assembly cutting the sugarcane plant below the soft joint, thereby removing a portion of the central stalk portion of the sugarcane plant, which reduces the sugar yield of the harvest. Due to elevation changes of the ground surface, changes in sugarcane plant height, etc., the elevation of the soft joint of the sugarcane plants relative to the sugarcane harvester continuously changes. As such, the vertical position of the topper assembly above the ground surface must be continuously monitored, controlled and/or adjusted to properly position the topper assembly at the soft joint.

SUMMARY

A sugarcane harvester is provided. The sugarcane harvester includes a frame and a topper assembly mounted to the frame. The topper assembly includes a top cutter that is positioned for severing an upper leaf portion of a sugarcane plant from a central stalk portion of the sugarcane plant. The topper assembly includes a topper actuator operable to move the top cutter relative to the frame to adjust a cut height of the top cutter relative to a ground surface. An image sensor is positioned to capture an image of a cut cross section of the sugarcane plant after removal of the upper leaf portion by the top cutter. A controller is disposed in communication with the image sensor and the topper actuator. The controller includes a processor and a memory having a topper height control algorithm stored thereon. The processor is operable to execute the topper height control algorithm to receive the image of the cut cross section of the sugarcane plant from the image sensor and determine a location of the cut cross section of the sugarcane plant relative to a soft joint of the sugarcane plant from the image of the cut cross section of the sugarcane plant. The controller may then control the topper actuator to adjust the cut height of the top cutter relative to the ground surface based on the location of the cut cross section of the sugarcane plant relative to the soft joint of the sugarcane plant.

In one aspect of the disclosure, the image sensor may include, but is not limited to, one of a Red Green Blue (RGB) image sensor, an Infra-Red (IR) image sensor, a Near Infra-Red (NIR) image sensor, a multi-spectral image sensor, a mono camera, or a stereo camera.

In one aspect of the disclosure, the image sensor is positioned vertically above the top cutter relative to the ground surface so that the image sensor may capture an image of the cross sectional cut of the sugarcane plant looking downward from above.

In one aspect of the disclosure, the image sensor is positioned to capture the image of the cut cross section of the sugarcane plant at a location disposed rearward of the top cutter relative to a direction of travel during operation so that the image sensor may capture an image of the cross sectional cut of the sugarcane plant after the upper leafy portion of the sugarcane plant has been severed and removed.

In one aspect of the disclosure, the sugarcane harvester includes a basecutter assembly that is mounted to the frame adjacent the ground surface. The basecutter assembly is operable to sever the central stalk portion of the sugarcane plant from a root or bottom root portion of the sugarcane plant adjacent the ground surface. The image sensor may be positioned to capture the image of the cut cross section of the sugarcane plant at a location disposed forward of a cutting edge of the basecutter assembly relative to a direction of travel during operation.

In one aspect of the disclosure, the processor is operable to execute the topper height control algorithm to analyze the image of the cut cross section of the sugarcane plant to identify discrete leaf sections in the cut cross section of the sugarcane plant. The leaf sections in the sugarcane plant begin to form at a soft joint of the sugarcane plant, and travel upward. The leaves of the sugarcane plant become more distinct and/or more separated as the distance upward and away from the soft joint increases. Portions of the sugarcane plant below the soft joint do not exhibit any discernable and/or discrete sections indicating leaf formation.

In one aspect of the disclosure, the processor may be operable to execute the topper height control algorithm to determine that the cut cross section of the sugarcane plant is disposed above the soft joint when at least one discrete leaf section is identified in the image of the cut cross section of the sugarcane plant. In other words, the identification of at least one discrete leaf section in the cross sectional cut of the sugarcane plant may be used as an indicator that the sugarcane plant was cut at a location disposed above the soft joint. In contrast, the processor may be operable to execute the topper height control algorithm to determine that the cut cross section of the sugarcane plant is disposed below the soft joint when no discrete leaf sections are identified in the image of the cut cross section of the sugarcane plant. In other words, the failure to identify at least one discrete leaf section in the cross sectional cut of the sugarcane plant may be used as an indicator that the sugarcane plant was cut at a location disposed below the soft joint.

In one aspect of the disclosure, the processor may be operable to control the topper actuator to increase the cut height of the top cutter relative to the ground surface when the cut cross section is determined to be below the soft joint of the sugarcane plant, thereby moving the top cutter toward and closer to the soft joint. In contrast, the processor may be operable to control the topper actuator to decrease the cut height of the top cutter relative to the ground surface when the cut cross section is determined to be above the soft joint of the sugarcane plant, thereby moving the top cutter toward and closer to the soft joint.

A method of operating a sugarcane harvester is also provided. The method includes sensing an image of a cut cross section of a sugarcane plant with an image sensor after a top cutter has severed an upper leaf portion of the sugarcane plant from a central stalk portion of the sugarcane plant. A controller analyzes the image of the cut cross section to determine if a location of the cut cross section in the image is disposed above a soft joint of the sugarcane plant, or if the location of the cut cross section in the image is disposed below the soft joint of the sugarcane plant. The controller may then control a topper actuator to adjust a cut height of the top cutter relative to the ground surface based on the determined location of the cut cross section in the image relative to the soft joint of the sugarcane plant.

In one aspect of the disclosure, analyzing the image of the cut cross section to determine the location of the cut cross section in the image relative to the soft joint includes analyzing the image of the cut cross section with the controller to identify discrete leaf sections in the cut cross section of the sugarcane plant. The controller may determine that the cut cross section in the image is disposed at a location above the soft joint of the sugarcane plant when at least one discrete leaf section is identified by the controller in the image of the cut cross section of the sugarcane plant. The controller may then decrease the cut height of the top cutter relative to the ground surface when the cut cross section is determined to be above the soft joint of the sugarcane plant, thereby moving the cut height closer to the soft joint.

In one aspect of the disclosure, the controller may determine that the cut cross section in the image is disposed at a location below the soft joint of the sugarcane plant when no discrete leaf sections are identified by the controller in the image of the cut cross section of the sugarcane plant. The controller may then increase the cut height of the top cutter relative to the ground surface when the cut cross section is determined to be below the soft joint of the sugarcane plant, thereby moving the cut height closer to the soft joint.

A topper assembly for a sugarcane harvester is also provided. The topper assembly includes an image sensor positioned to capture an image of a cut cross section of a sugarcane plant after removal of an upper leaf portion of the sugarcane plant. A controller is disposed in communication with the image sensor. The controller includes a processor and a memory having a topper height control algorithm stored thereon. The processor is operable to execute the topper height control algorithm to receive the image of the cut cross section of the sugarcane plant from the image sensor, and analyze the image of the cut cross section of the sugarcane plant to identify discrete leaf sections in the cut cross section of the sugarcane plant. When at least one discrete leaf section is identified in the image of the cut cross section of the sugarcane plant, the controller may determine that the cut cross section of the sugarcane plant is disposed above the soft joint. When the cut cross section is determined to be above the soft joint of the sugarcane plant, the controller may generate a control signal for controlling a topper actuator to decrease a cut height of a top cutter relative to a ground surface.

In one aspect of the disclosure of the topper assembly, the processor may be operable to execute the topper height control algorithm to determine that the cut cross section of the sugarcane plant is disposed below the soft joint when no discrete leaf sections are identified in the image of the cut cross section of the sugarcane plant. When the cut cross section is determined to be below the soft joint of the sugarcane plant, the controller may generate a control signal for controlling the topper actuator to increase the cut height of the top cutter relative to the ground surface.

Accordingly, the controller of the sugarcane harvester may automatically adjust the cut height of the top cutter to sever the upper leaf portion of the sugarcane plant near the soft joint. By using the image of the cut cross section of the sugarcane plant, the controller may identify discrete leaf sections in the image of the cut cross section of the sugarcane plant. Identification of any discrete leaf sections indicates that the sugarcane plant was cut above the soft joint. Failure to identify any discrete leaf sections in the image of the cut cross section of the sugarcane plant indicates that the sugarcane plant was cut below the soft joint. The controller may raise or lower the top cutter accordingly.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
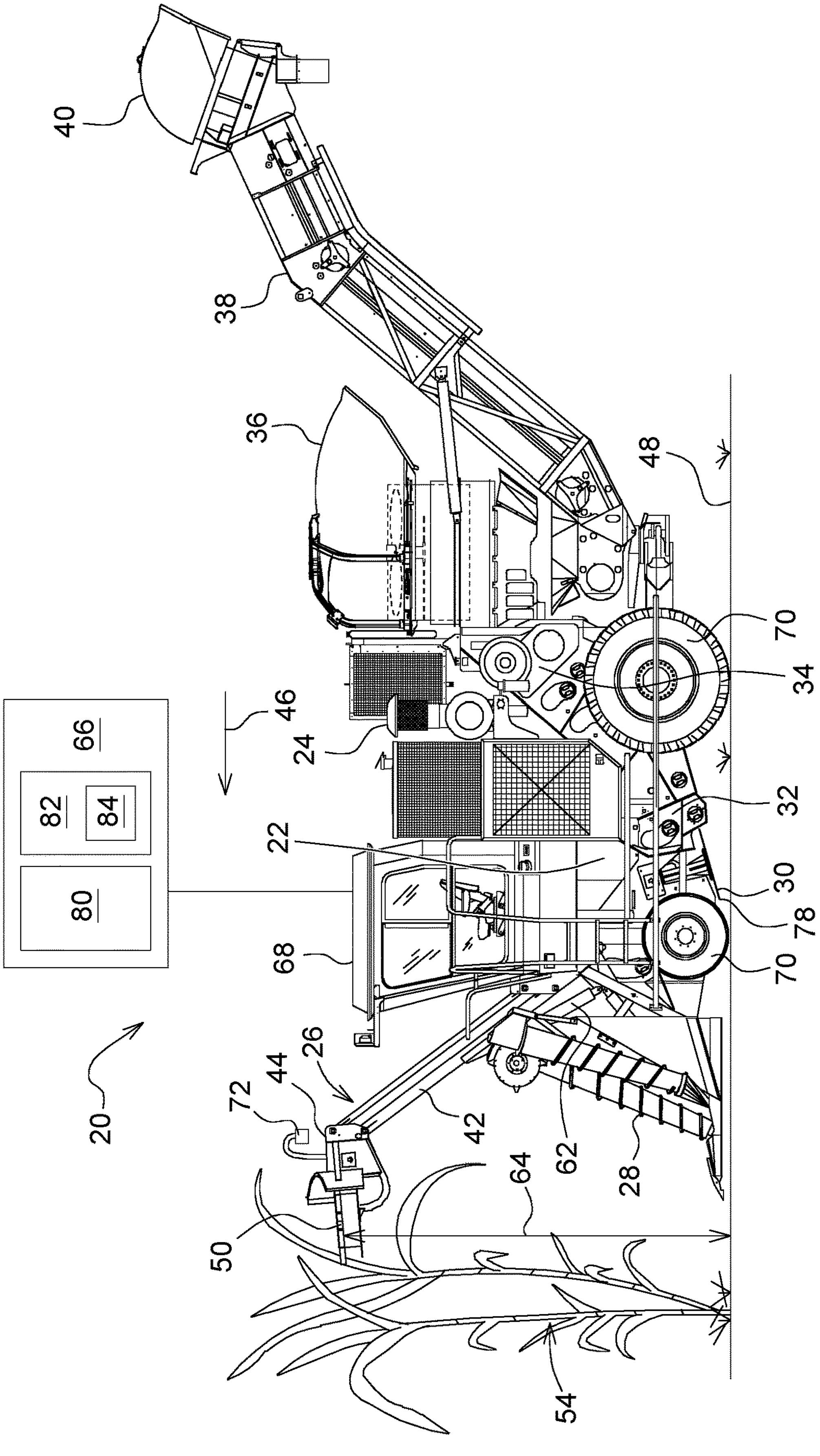
FIG. 1 is a schematic side view of a sugarcane harvester.
Figure 2:
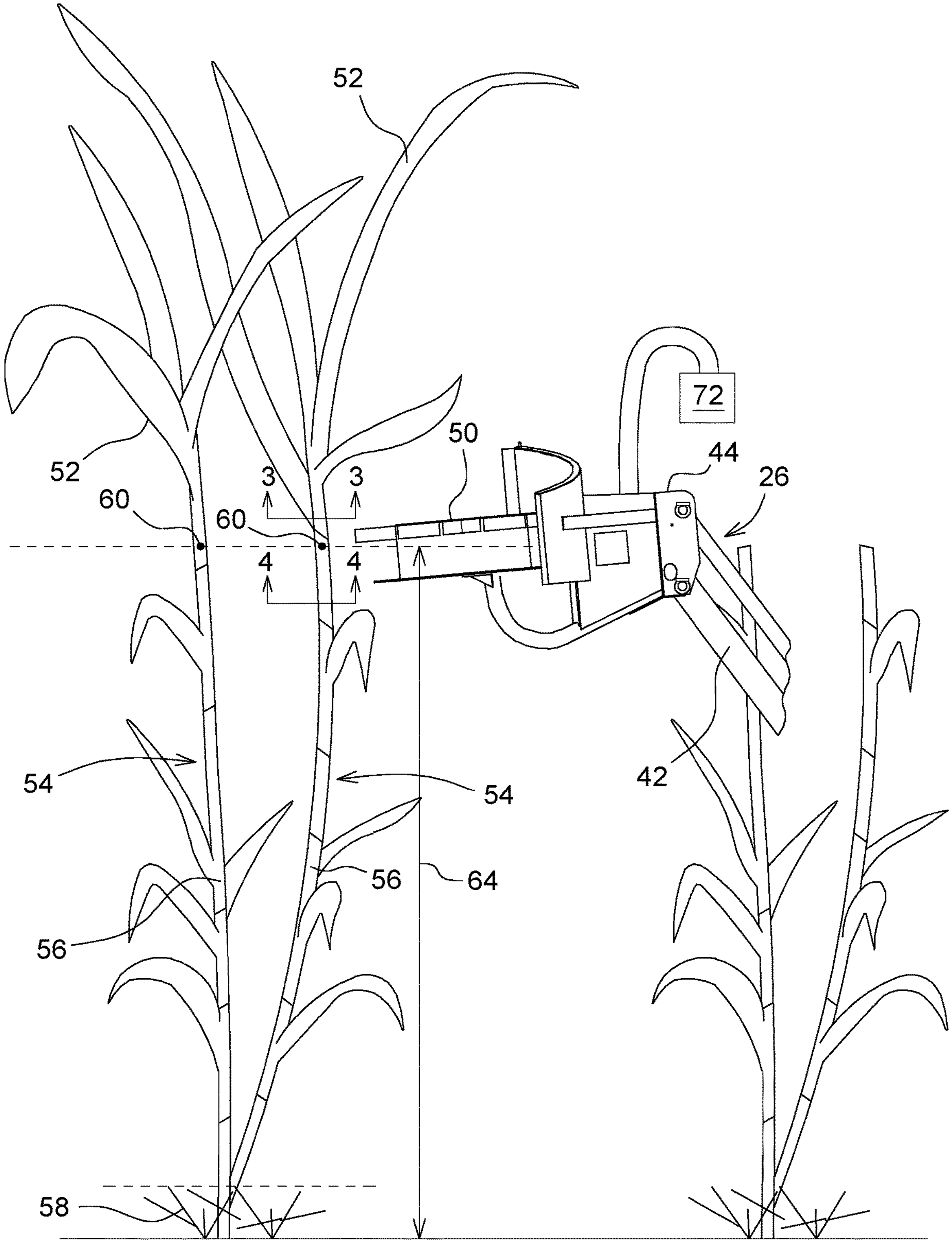
FIG. 2 is a schematic side view of a topper assembly cutting an upper leaf portion from a sugarcane stalk.

Referring to the Figures, wherein like numerals indicate like parts throughout the several views, a sugarcane harvester is generally shown at 20 in FIG. 1. The sugarcane harvester 20 includes a main frame 22, supporting various cutting, routing and processing devices. An engine 24 may supply power for driving the sugarcane harvester 20 and for powering various driven components of the sugarcane harvester 20. In certain embodiments, the engine 24 may directly power a main hydraulic pump (not shown). Various driven components of the sugarcane harvester 20 may be powered by hydraulic motors receiving hydraulic power from the main hydraulic pump via one or more hydraulic loops (not shown).

Referring to FIG. 1, among other components and features, some of which are not described herein, the sugarcane harvester 20 may include a topper assembly 26, a left and a right crop divider scroll 28 (the left crop divider scroll 28 is not shown), an upper knockdown roller and a lower knockdown roller (the upper and lower knockdown rollers are not shown), a basecutter assembly 30, a feed section 32, a chopping section 34, a primary extractor 36, an elevator 38, and a secondary extractor 40.

The topper assembly 26 is mounted to the main frame 22. The topper assembly 26 includes a cantilevered arm 42 structure attached to the main frame 22. The cantilevered arm 42 extends from the main frame 22 to a distal end 44 thereof, in a generally forward direction relative to a direction of travel 46 during operation, and a generally upward direction relative to a ground surface 48. The topper assembly 26 includes a top cutter 50 supported by the cantilevered arm 42 proximate the distal end 44 of the cantilevered arm 42. The top cutter 50 is positioned for severing an upper leaf portion 52 of a sugarcane plant 54 from a central stalk portion 56 of the sugarcane plant 54. The top cutter 50 may include a blade or other cutting device and/or system configured for cutting the sugarcane plant 54. The particular components, structure and operation of the top cutter 50 are understood by those skilled in the art, and are therefore not described in greater detail herein.

The sugarcane plant 54 may be defined to include a bottom root portion 58, the central stalk portion 56, and the upper leaf portion 52. The central stalk portion 56 of the sugarcane plant 54 is the desirable portion of the plant containing sugar. The central stalk portion 56 of the sugarcane plant 54 is severed from the bottom root portion 58 during harvest operations, thereby enabling the bottom root portion 58 of the sugarcane plant 54 to remain in the ground for regrowth the following growing season. The upper leaf portion 52 of the sugarcane plant 54 may be severed from the central stalk portion 56 and discarded prior to the sugarcane harvester 20 processing the central stalk portion 56 of the sugarcane plant 54 into billets. The central stalk portion 56 and the upper leaf portion 52 of the sugarcane plant 54 may be separated by a soft joint 60. The soft joint 60 of the sugarcane plant 54 is the portion of the sugarcane joint at which the upper leaves of the sugarcane plant 54 join the central stalk portion 56. Desirably, the top cutter 50 severs the sugarcane plant 54 at the soft joint 60, removing the upper leaf portion 52 of the sugarcane plant 54 so as not to be ingested into the sugarcane harvester 20, while retaining all of the central stalk portion 56 of the sugarcane plant 54 for processing into billets.

The topper assembly 26 includes a topper actuator 62. The topper actuator 62 is operable to move the top cutter 50 relative to the main frame 22 to thereby adjust a cut height 64 of the top cutter 50 relative to the ground surface 48. The cut height 64 may be defined as the vertical distance between the top cutter 50 and the ground surface 48. A controller 66 may control the topper actuator 62 to position the top cutter 50 at a cut height 64 that approximates the soft joint 60 of the sugarcane plants 54. The topper actuator 62 may include, but is not limited to, hydraulic actuators, electrical actuators, control valves, linkage systems, etc., suitable for moving the cantilevered arm 42 relative to the frame main 22. The particular components, structure and operation of the topper actuator 62 are understood by those skilled in the art, and are therefore not described in greater detail herein.

The left and right crop divider scrolls 28 are adapted to lift the sugarcane for feeding into a throat of the sugarcane harvester 20. The upper and lower knockdown rollers are adapted to lean standing sugarcane plants 54 of crop material in the forward direction relative to the direction of travel 46 of the sugarcane harvester 20 during operation.

The basecutter assembly 30 is mounted to the main frame 22 adjacent the ground surface 48. The basecutter assembly 30 is operable to sever the central stalk portion 56 of the sugarcane plant 54 from the bottom root portion 58 of the sugarcane plant 54. The basecutter assembly 30 is adapted to sever the sugarcane plants 54 knocked down or leaned over in the forward direction by the upper and lower knockdown rollers. Additionally, the basecutter assembly 30 is operable to move and/or feed the central stalk portion 56 of the sugarcane plant 54 to the feed section 32.

The feed section 32 is adapted to receive a mat of severed sugarcane crop material from the basecutter assembly 30, and to move the mat of crop material rearwardly for further processing. The feed section 32 may include, for example, successive pairs of upper and lower feed rollers rotatably supported by the main frame 22. At least one pair of the upper and lower feed rollers may be powered to transport the mat of the cut sugarcane crop material to the chopping section 34.

The chopping section 34 is adapted to receive the mat from the feed section 32 and to cut the sugarcane plant 54 into billets. The primary extractor 36 is positioned downstream from the chopping section 34 and is adapted to separate debris, including, for example, crop residue (e.g., leafy material), from the billets and remove the debris from the sugarcane harvester 20.

The elevator 38 is positioned at the rear of the sugarcane harvester 20 to receive the cleaned flow of billets, and is adapted to convey the billets to an elevated position where the billets are discharged into a transport vehicle to be hauled away. The secondary extractor 40 (some embodiments may not have a secondary extractor 40) is positioned near the top of the elevator 38, and is adapted to further separate debris from the billets and to remove the debris from the sugarcane harvester 20.

The sugarcane harvester 20 may include an operator station 68 and traction elements 70. The various user input and control devices, data output devices, etc., may be located within the operator station 68. A human operator may operate the sugarcane harvester 20 from the operator station 68. In certain embodiments, the main frame 22 may be supported by a transport frame such as track frame supporting the traction elements 70. The traction elements 70 are positioned on the left and right sides of the sugarcane harvester 20 for propelling the sugarcane harvester 20 through a field and along the ground surface 48. Each traction element 70 may include, but are not limited to, a track unit or a ground-engaging wheel.

The sugarcane harvester 20 includes an image sensor 72. The image sensor 72 is positioned to capture an image of a cut cross section 76 of the sugarcane plant 54 after removal of the upper leaf portion 52 by the top cutter 50. In one implementation, the image sensor 72 is positioned vertically above the top cutter 50 relative to the ground surface 48. In such a position, the image sensor 72 may capture the image of the cut surface of the sugarcane plant 54 from above looking downward onto the cut surface of the sugarcane plant 54. Additionally, the image sensor 72 is positioned to capture the image of the cut cross section 76 of the sugarcane plant 54 at a location disposed rearward of the top cutter 50 relative to the direction of travel 46 during operation so that the image is of the cut surface of the sugarcane plant 54 after the upper leaf portion 52 of the sugarcane plant 54 has been severed and removed from the central stalk portion 56 of the sugarcane plant 54. It should be appreciated that the physical location of the image sensor 72 may vary from what is described herein.

Additionally, the image sensor 72 may be positioned to capture the image of the cut cross section 76 of the sugarcane plant 54 at a location disposed forward of a cutting edge 78 of the basecutter assembly 30 relative to the direction of travel 46 during operation. As such, the image sensor 72 may be positioned to capture images after the upper leaf portion 52 of the sugarcane plant 54 has been removed, and prior to the basecutter assembly 30 severing the central stalk portion 56 from the bottom root portion 58 of the sugarcane plant 54. By doing so, the central stalk portion 56 presents the cut surface exposing the cut cross section 76 upward in view of the image sensor 72.

The image sensor 72 may include any device capable of capturing an image and/or sensing data that may be used to generate the image from which the controller 66 may detect and/or determine a shape, a geometry, a line, a texture, an appearance or some other characteristic of the sugarcane plant 54 tissue. The image sensor 72 may be operable to capture images suitable for macroscopic and/or microscopic level analysis by the controller 66. For example, the image sensor 72 may include, but is not limited to, one of a Red Green Blue (RGB) image sensor, an Infra-Red (IR) image sensor, a Near Infra-Red (NIR) image sensor, a multi-spectral image sensor, a mono camera, or a stereo camera, a still camera device, a video camera device, similar imaging devices, and/or combinations of the above described devices.

As noted above, the sugarcane harvester 20 includes the controller 66. The controller 66 may be disposed in communication with the image sensor 72 and the topper actuator 62. The controller 66 is operable to receive image signals from the image sensor 72, and communicate a control signal to the topper actuator 62. While the controller 66 is generally described herein as a singular device, it should be appreciated that the controller 66 may include multiple devices linked together to share and/or communicate information therebetween. Furthermore, it should be appreciated that the controller 66 may be located on the sugarcane harvester 20 or located remotely from the sugarcane harvester 20.

The controller 66 may alternatively be referred to as a computing device, a computer, a control unit, a control module, a module, etc. The controller 66 includes a processor 80, a memory 82, and all software, hardware, algorithms, connections, sensors, etc., necessary to manage and control the operation of the image sensor 72 and the topper actuator 62. As such, a method may be embodied as a program or algorithm operable on the controller 66. It should be appreciated that the controller 66 may include any device capable of analyzing data from various sensors, comparing data, making decisions, and executing the required tasks.

As used herein, "controller 66" is intended to be used consistent with how the term is used by a person of skill in the art, and refers to a computing component with processing, memory 82, and communication capabilities, which is utilized to execute instructions (i.e., stored on the memory 82 or received via the communication capabilities) to control or communicate with one or more other components. In certain embodiments, the controller 66 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 66 may be in communication with other components on the sugarcane harvester 20, such as hydraulic components, electrical components, and operator inputs within the operator station 68 of the sugarcane harvester 20. The controller 66 may be electrically connected to these other components by a wiring harness such that messages, commands, and electrical power may be transmitted between the controller 66 and the other components. Although the controller 66 is referenced in the singular, in alternative embodiments the configuration and functionality described herein can be split across multiple devices using techniques known to a person of ordinary skill in the art.

The controller 66 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 82 may include any non-transitory/tangible medium which participates in providing data or computer-readable instructions. The memory 82 may be non-volatile or volatile. Non-volatile media may include, for example, optical or magnetic disks and other persistent memory. Example volatile media may include dynamic random access memory (DRAM), which may constitute a main memory. Other examples of embodiments for memory 82 include a floppy, flexible disk, or hard disk, magnetic tape or other magnetic medium, a CD-ROM, DVD, and/or any other optical medium, as well as other possible memory devices such as flash memory.

The controller 66 includes the tangible, non-transitory memory 82 on which are recorded computer-executable instructions, including a topper height control algorithm 84. The processor 80 of the controller 66 is configured for executing the topper height control algorithm 84. The topper height control algorithm 84 implements a method of operating the sugarcane harvester 20, described in detail below. As such, it should be appreciated that the controller 66 may be operable and/or configured for executing the following process steps.

Figure 5:
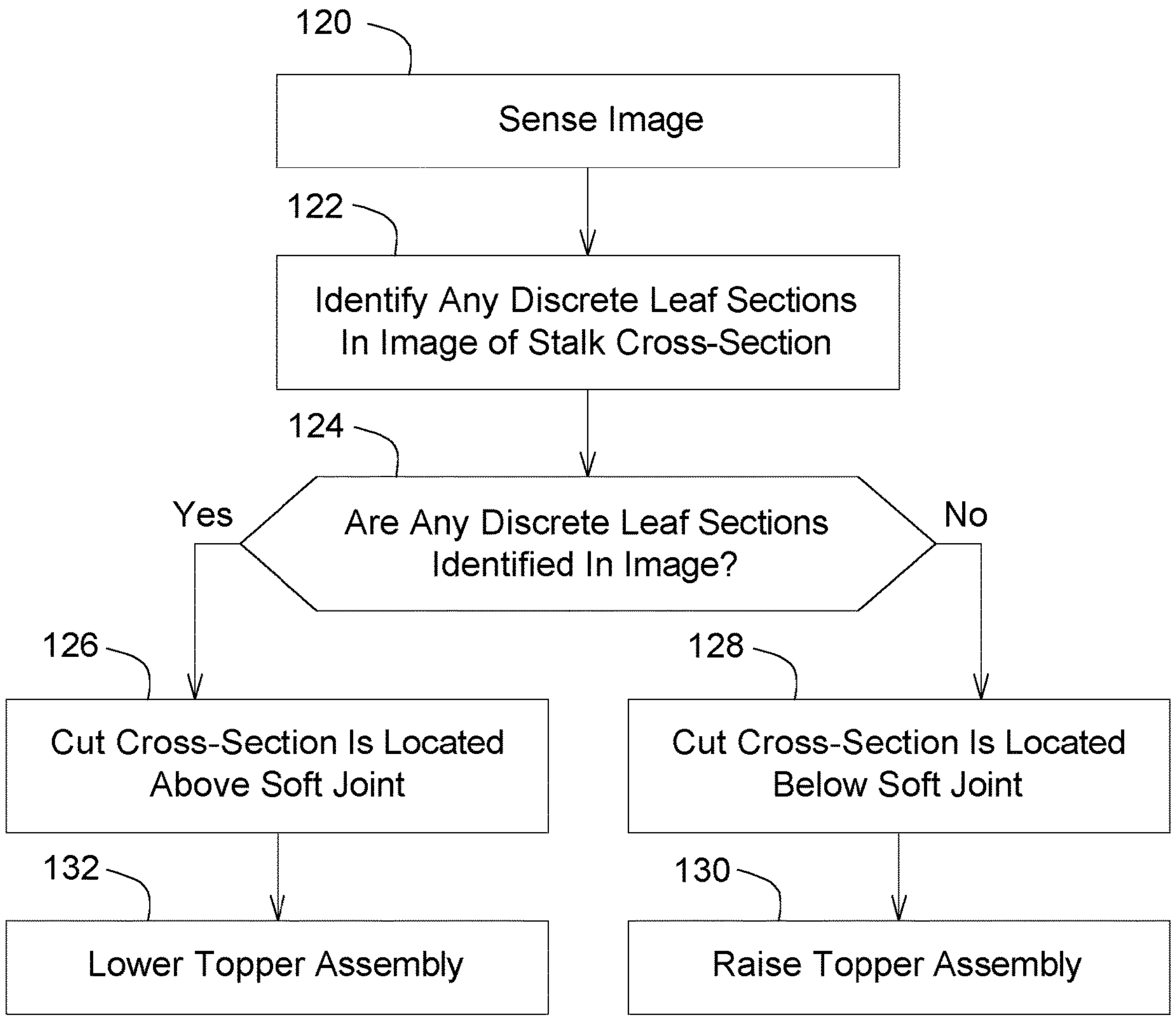
FIG. 5 is a flow chart representing a method of operating the sugarcane harvester.

Referring to FIG. 5, the process includes sensing the image of the cut cross section 76 of the sugarcane plant 54 with the image sensor 72. The step of sensing the image is generally indicated by box 120 shown in FIG. 5. It should be appreciated that the images sensor may capture the image, or sense data from which the controller 66 may generate the image of the cut cross section 76 of the sugarcane plant 54. It should be appreciated that the cut cross section 76 of the sugarcane plant 54 is defined by the surface of the sugarcane plant 54 exposed by the cut that removed the upper leaf portion 52 of the sugarcane plant 54. The cut severing the upper leaf portion 52 of the sugarcane plant 54 is generally transverse to the central longitudinal axis of the central portion of the sugarcane plant 54, thereby exposing the cross sectional cut generally perpendicular through the sugarcane plant 54. The cut surface of the sugarcane plant 54, defining the cut cross section 76 thereof, exposes the internal tissue of the sugarcane plant 54.

The image is sensed and/or detected after the top cutter 50 has severed and removed the upper leaf portion 52 of the sugarcane plant 54 from the central stalk portion 56 of the sugarcane plant 54. As described above, the image may be sensed at a location disposed rearward of the top cutter 50 looking downward onto the cut surface of the sugarcane plant 54 forming the cut cross section 76 of the sugarcane plant 54. Additionally, if the image is sensed prior to the basecutter assembly 30 severing the central stalk portion 56 from the bottom root portion 58 of the sugarcane plant 54, the cut surface defining the cut cross section 76 is generally disposed in an upward facing orientation, thereby enabling the image sensor 72 to capture the image from above looking down.

The controller 66 is configured to receive the image of the cut cross section 76 of the sugarcane plant 54 from the image sensor 72, and/or the data sensed from the image sensor 72, from which the controller 66 may generate or create the image of the cut cross section 76.

The controller 66 may then analyze the image of the cut cross section 76 of the sugarcane plant 54 to identify discrete leaf sections 86 in the cut cross section 76 of the sugarcane plant 54. The step of analyzing the image of the cut cross section 76 to identify the discrete leaf sections 86 is generally indicated by box 122 shown in FIG. 5. As described above, the leaves of the upper leaf portion 52 of the sugarcane plant 54 develop and/or begin at the soft joint 60 and extend upward. The discrete leaf sections 86 may be identified in the image of the cut cross section 76 by the controller 66 using image analysis or other similar algorithms, based on identifiable characteristics. For example, discernable line segments and/or shapes in the plant tissue may indicate and/or identify a discrete leaf section 86, different textures and/or different zones of texture of the plant tissue may indicate and/or identify a discrete leaf section 86, different colors and/or different zones of colors of the plant tissue may indicate and/or identify a discrete leaf section 86. It should be appreciated that the controller 66 may use some other characteristic of the sugarcane plant 54 that is visible and/or detectable in the image of the cut cross section 76 of the sugarcane plant 54 to identify the discrete leaf sections 86.

The controller 66 may then determine a location of the cut cross section 76 of the sugarcane plant 54 relative to the soft joint 60 of the sugarcane plant 54 from the image of the cut cross section 76 of the sugarcane plant 54. The step of determining the location of the cut cross section 76 relative to the soft joint 60 is generally indicated by box 124 shown in FIG. 5. As described above, the leaves of the upper leaf portion 52 of the sugarcane plant 54 originate at the soft joint 60 and extend upward. As such, referring to FIG. 3, an image of the cut cross section 76 of the sugarcane plant 54 positioned above the soft joint 60, i.e., in the upper leaf portion 52 of the sugarcane plant 54, will present and/or exhibit identifiable leaf sections. In contrast, referring to FIG. 4, an image of the cut cross section 76 of the sugarcane plant 54 positioned below the soft joint 60, i.e., in the central stalk portion 56 of the sugarcane plant 54, will not present and/or exhibit any identifiable leaf sections.

Figure 3:
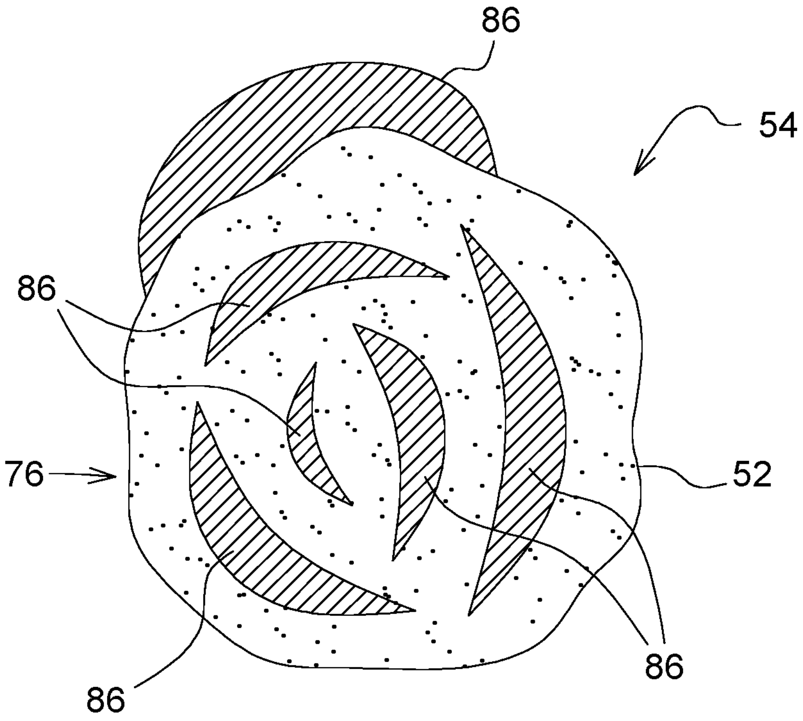
FIG. 3 is a schematic cross sectional view of the upper leaf portion of the sugarcane stalk.
Figure 4:
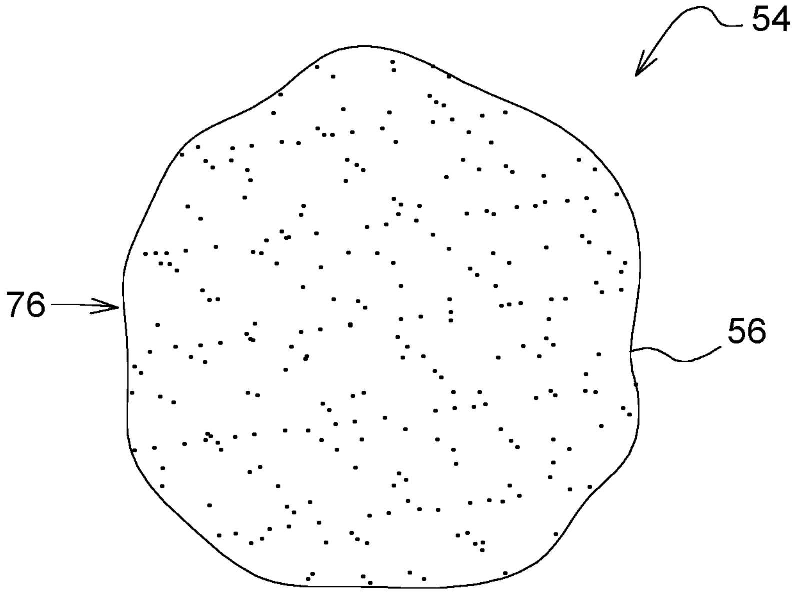
FIG. 4 is a schematic cross sectional view of a central stalk portion of the sugarcane stalk.

The controller 66 may analyze the image of the cut cross section 76 to determine if the location of the cut cross section 76 in the image is disposed above the soft joint 60 of the sugarcane plant 54, or if the location of the cut cross section 76 in the image is disposed below the soft joint 60 of the sugarcane plant 54, based on the presence of any identifiable leaf sections in the image of the cut cross section 76 of the sugarcane plant 54. For example, when at least one discrete leaf section 86 is identified in the image of the cut cross section 76 of the sugarcane plant 54, such as shown in FIG. 3, the controller 66 may determine that the cut cross section 76 of the sugarcane plant 54 is disposed above the soft joint 60. The step of determining that the cut cross section 76 is disposed above the soft joint 60 is generally indicated by box 126 shown in FIG. 5. In contrast, when no discrete leaf sections 86 are identified in the image of the cut cross section 76 of the sugarcane plant 54, such as shown in FIG. 4, the controller 66 may determine that the cut cross section 76 of the sugarcane plant 54 is disposed below the soft joint 60. The step of determining that the cut cross section 76 is disposed below the soft joint is generally indicated by box 128 shown in FIG. 5.

Based on the determined location of the cut cross section 76 in the image relative to the soft joint 60 of the sugarcane plant 54, the controller 66 may control the topper actuator 62 to adjust the cut height 64 of the top cutter 50 relative to the ground surface 48. For example, when the cut cross section 76 of the sugarcane plant 54 is determined to be below the soft joint 60 of the sugarcane plant 54, the controller 66 may generate a control signal and communicate the control signal to the topper actuator 62 for controlling the topper actuator 62 to increase the cut height 64 of the top cutter 50 relative to the ground surface 48, thereby moving the top cutter 50 upward and closer to the soft joint 60. The step of raising the topper assembly 26 is generally indicated by box 130 shown in FIG. 5. In contrast, when the cut cross section 76 is determined to be above the soft joint 60 of the sugarcane plant 54, the controller 66 may generate a control signal and communicate the control signal to the topper actuator 62 for controlling the topper actuator 62 to decrease the cut height 64 of the top cutter 50 relative to the ground surface 48, thereby moving the top cutter 50 downward and closer to the soft joint 60. The step of lowering the topper assembly 26 is generally indicated by box 132 shown in FIG. 5.

The control signal may include, for example, but is not limited to, an electrical signal to a control valve, a hydraulic signal, a pneumatic signal, etc. The control signal may directly control movement of the topper actuator 62, e.g., an electric signal that directly controls and motivates an electric actuator, or may control some other component, e.g., an electrically actuated hydraulic solenoid valve, that in turn controls movement of the topper actuator 62. The control signal may be generated and communicated by the controller 66 in a manner understood by those skilled in the art.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A sugarcane harvester comprising:
- a frame;
- a topper assembly mounted to the frame and including a top cutter positioned for severing an upper leaf portion of a sugarcane plant from a central stalk portion of the sugarcane plant;
- wherein the topper assembly includes a topper actuator operable to move the top cutter relative to the frame to adjust a cut height of the top cutter relative to a ground surface;
- an image sensor positioned to capture an image of a cut cross section of the sugarcane plant after removal of the upper leaf portion by the top cutter;
- a controller disposed in communication with the image sensor and the topper actuator, wherein the controller includes a processor and a memory having a topper height control algorithm stored thereon, wherein the processor is operable to execute the topper height control algorithm to:
  - receive the image of the cut cross section of the sugarcane plant from the image sensor;
  - determine a location of the cut cross section of the sugarcane plant relative to a soft joint of the sugarcane plant from the image of the cut cross section of the sugarcane plant; and
  - control the topper actuator to adjust the cut height of the top cutter relative to the ground surface based on the location of the cut cross section of the sugarcane plant relative to the soft joint of the sugarcane plant.

2. The sugarcane harvester set forth in claim 1, wherein the image sensor includes one of a Red Green Blue (RGB) image sensor, an Infra-Red (IR) image sensor, a Near Infra-Red (NIR) image sensor, a multi-spectral image sensor, a mono camera, or a stereo camera.

3. The sugarcane harvester set forth in claim 1, wherein the image sensor is positioned vertically above the top cutter relative to the ground surface.

4. The sugarcane harvester set forth in claim 1, wherein the image sensor is positioned to capture the image of the cut cross section of the sugarcane plant at a location disposed rearward of the top cutter relative to a direction of travel during operation.

5. The sugarcane harvester set forth in claim 1, further comprising a basecutter assembly mounted to the frame adjacent the ground surface and operable to sever the central stalk portion of the sugarcane plant from a bottom root portion of the sugarcane plant.

6. The sugarcane harvester set forth in claim 5, wherein the image sensor is positioned to capture the image of the cut cross section of the sugarcane plant at a location disposed forward of a cutting edge of the basecutter assembly relative to a direction of travel during operation.

7. The sugarcane harvester set forth in claim 1, wherein the processor is operable to execute the topper height control algorithm to analyze the image of the cut cross section of the sugarcane plant to identify discrete leaf sections in the cut cross section of the sugarcane plant.

8. The sugarcane harvester set forth in claim 7, wherein the processor is operable to execute the topper height control algorithm to determine that the cut cross section of the sugarcane plant is disposed above the soft joint when at least one discrete leaf section is identified in the image of the cut cross section of the sugarcane plant.

9. The sugarcane harvester set forth in claim 7, wherein the processor is operable to execute the topper height control algorithm to determine that the cut cross section of the sugarcane plant is disposed below the soft joint when no discrete leaf sections are identified in the image of the cut cross section of the sugarcane plant.

10. The sugarcane harvester set forth in claim 1, wherein the processor is operable to control the topper actuator to increase the cut height of the top cutter relative to the ground surface when the cut cross section is determined to be below the soft joint of the sugarcane plant.

11. The sugarcane harvester set forth in claim 1, wherein the processor is operable to control the topper actuator to decrease the cut height of the top cutter relative to the ground surface when the cut cross section is determined to be above the soft joint of the sugarcane plant.

12. A method of operating a sugarcane harvester, the method comprising:
- sensing an image of a cut cross section of a sugarcane plant with an image sensor after a top cutter has severed an upper leaf portion of the sugarcane plant from a central stalk portion of the sugarcane plant;
- analyzing the image of the cut cross section with a controller to determine if a location of the cut cross section in the image is disposed above a soft joint of the sugarcane plant, or if the location of the cut cross section in the image is disposed below the soft joint of the sugarcane plant; and
- controlling a topper actuator with the controller to adjust a cut height of the top cutter relative to the ground surface based on the determined location of the cut cross section in the image relative to the soft joint of the sugarcane plant.

13. The method set forth in claim 12, wherein analyzing the image of the cut cross section to determine the location of the cut cross section in the image relative to the soft joint includes analyzing the image of the cut cross section with the controller to identify discrete leaf sections in the cut cross section of the sugarcane plant.

14. The method set forth in claim 13, further comprising determining that the cut cross section in the image is disposed at a location above the soft joint of the sugarcane plant when at least one discrete leaf section is identified by the controller in the image of the cut cross section of the sugarcane plant.

15. The method set forth in claim 14, wherein controlling the topper actuator with the controller to adjust the cut height of the top cutter relative to the ground surface includes decreasing the cut height of the top cutter relative to the ground surface when the cut cross section is determined to be above the soft joint of the sugarcane plant.

16. The method set forth in claim 13, further comprising determining that the cut cross section in the image is disposed at a location below the soft joint of the sugarcane plant when no discrete leaf sections are identified by the controller in the image of the cut cross section of the sugarcane plant.

17. The method set forth in claim 16, wherein controlling the topper actuator with the controller to adjust the cut height of the top cutter relative to the ground surface includes increasing the cut height of the top cutter relative to the ground surface when the cut cross section is determined to be below the soft joint of the sugarcane plant.

18. A topper assembly for a sugarcane harvester, the topper assembly comprising:

an image sensor positioned to capture an image of a cut cross section of a sugarcane plant after removal of an upper leaf portion of the sugarcane plant;

a controller disposed in communication with the image sensor, wherein the controller includes a processor and a memory having a topper height control algorithm stored thereon, wherein the processor is operable to execute the topper height control algorithm to:

receive the image of the cut cross section of the sugarcane plant from the image sensor;

analyze the image of the cut cross section of the sugarcane plant to identify discrete leaf sections in the cut cross section of the sugarcane plant;

determine that the cut cross section of the sugarcane plant is disposed above the soft joint when at least one discrete leaf section is identified in the image of the cut cross section of the sugarcane plant; and generate a control signal for controlling a topper actuator to decrease a cut height of a top cutter relative to a ground surface when the cut cross section is determined to be above the soft joint of the sugarcane plant.

19. The topper assembly set forth in claim 18, wherein the processor is operable to execute the topper height control algorithm to:

determine that the cut cross section of the sugarcane plant is disposed below the soft joint when no discrete leaf sections are identified in the image of the cut cross section of the sugarcane plant; and generate a control signal for controlling the topper actuator to increase the cut height of the top cutter relative to the ground surface when the cut cross section is determined to be below the soft joint of the sugarcane plant.

* * * * *